May 9, 1967 S. HAHN 3,318,133
APPARATUS FOR CALIBRATING THERMISTOR THERMOMETERS
Filed Aug. 27, 1964 2 Sheets-Sheet 2

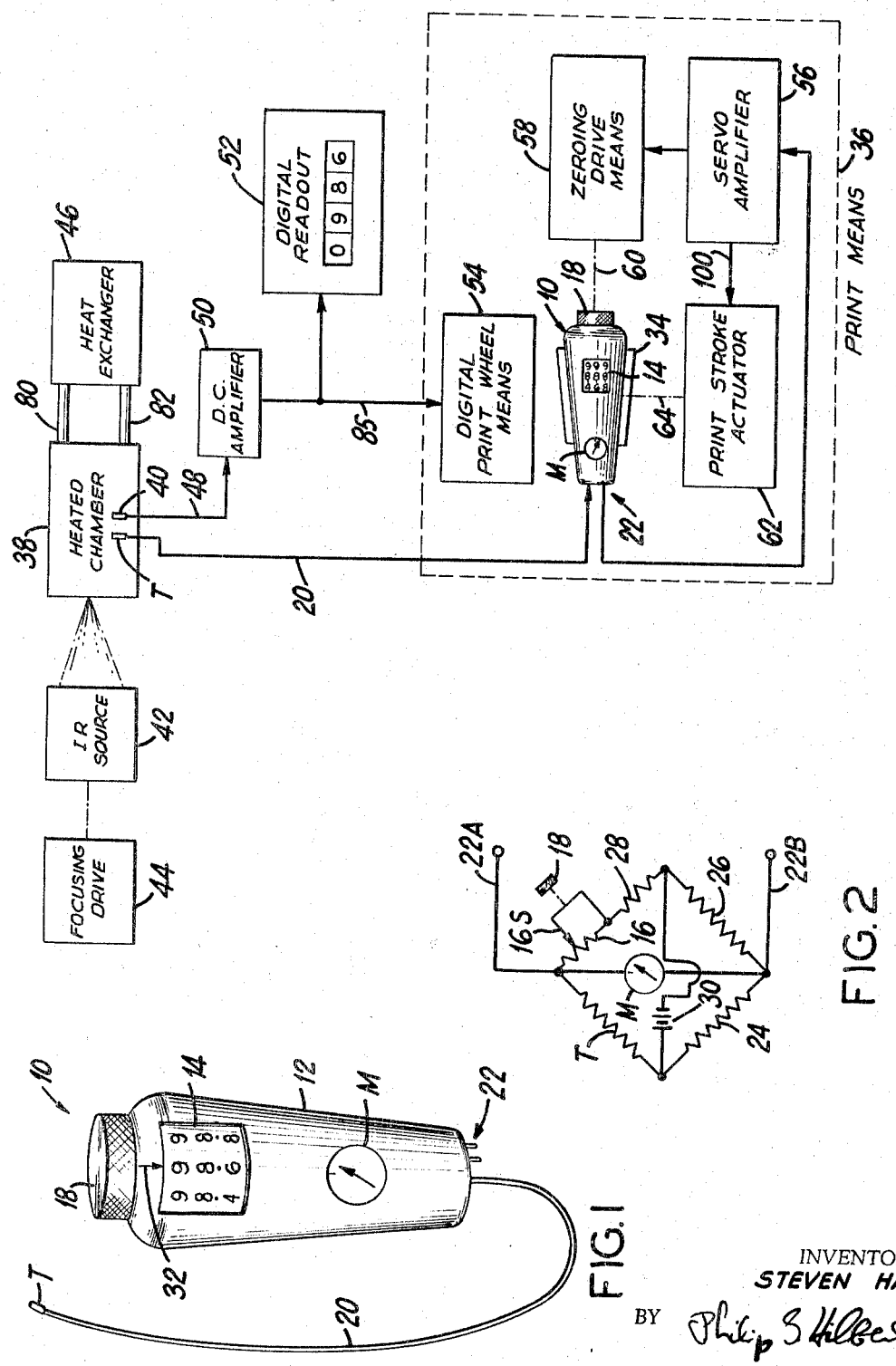

INVENTOR.
STEVEN HAHN

BY Philip S. Hilbert

ATTORNEY.

United States Patent Office 3,318,133
Patented May 9, 1967

3,318,133
APPARATUS FOR CALIBRATING THERMISTOR THERMOMETERS
Steven Hahn, New York, N.Y., assignor, by mesne assignments, to Round Hill Associates, Inc., New York, N.Y., a corporation of New York
Filed Aug. 27, 1964, Ser. No. 392,507
6 Claims. (Cl. 73—1)

This invention relates to thermometers and more particularly to the manufacture of thermometers employing thermistor elements.

One important application of thermometers generally is the clinical thermometer used in the medical arts. Thermistor type clinical thermometers have many advantages over conventional mercury-in-glass thermometers. In particular, the temperature probe of the thermistor thermometer is the size of a pin and cannot break in either oral or rectal usage. The temperature probe can be autoclaved, sterlized in boiling water or other suitable antiseptic solution. Temperature readings are substantially instantaneous. Read-out scales are considerably longer than with standard glass clinical thermometers. In addition, the temperature probe can be left in operative contact with the patient while he is sleeping or otherwise cannot move, and the temperature is read merely by pressing a button.

Although thermistor type clinical thermometers are available, they are extremely expensive because of the accuracy required for governmental medical approval. This accuracy is in the order of two-tenths of a degree Fahrenheit. The reason for this considerable expense is due to the fact that the components required in making the thermometer must be of high precision values and close to design center values. In other words, it is necessary to use, for example, resistors with only 1% tolerance. More important though, is the fact that the thermistors must have guaranteed repeatable resistance-temperature characteristics. Such components are extremely expensive. In addition, most of the presently available thermistor thermometers employ meters for direct read-out of the temperature. Such a meter, of necessity, must be very large in order to give the user an easily readable scale. Obviously, such a meter is expensive and furthermore, the meter movements must be highly reproducible from meter to meter.

It is accordingly an object of the invention to provide an improved thermistor type thermometer.

It is another object of the invention to provide improved apparatus and methods for producing thermistor thermometers which have a very high degree of accuracy and in particular a degree of accuracy no less than 0.2° F.

It is a further object of the invention to provide apparatus and methods for producing thermistor thermometers which use relatively inexpensive components, and particularly, components such as resistors and thermistors which have tolerances up to the order of 20.0% and wherein the thermistors do not have guaranteed repeatable resistance-temperature characteristics.

Briefly, the invention contemplates the individual calibration of each thermistor thermometer, which has a movable scale and a null indicating circuit with an adjustable means connected to the scale for adjusting the circuit to a null, and a thermistor element. The thermistor element is subjected to a source of heat; the temperature of the thermistor is measured and is used to select indicia indicative of the measured temperature. The adjustable means is adjusted until a null is indicated. The selected indicia is then printed on the scale when the null is indicated.

It should be noted that by employing the apparatus and methods of the invention, it is possible to produce a thermistor thermometer at a small fraction of the cost of thermistor type clinical thermometers, presently available.

Other objects and the features and advantages of the invention will be apparent from the following detailed description of the invention when read with the accompanying drawings which show by way of example and not limitation the now preferred embodiment of the invention.

In the drawings:

FIGURE 1 shows a perspective view of a thermistor type thermometer which may be manufactured with the apparatus of the invention;

FIGURE 2 shows a schematic diagram of the bridge circuit employed by the thermistor type thermometer of FIGURE 1;

FIGURE 3 shows a block diagram of apparatus embodying the invention;

Figure 4:
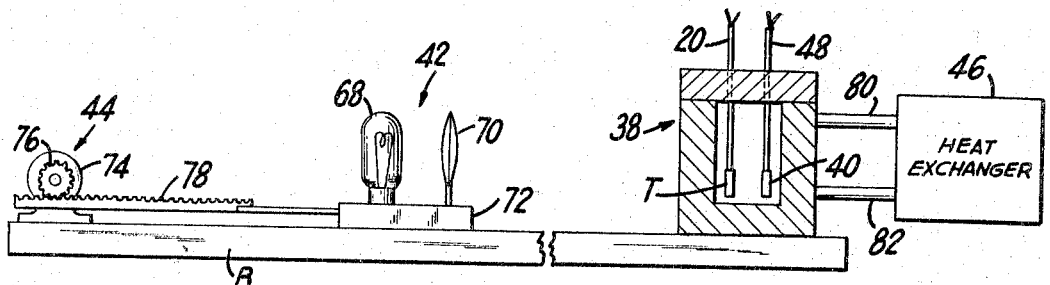
FIGURE 4 shows an elevational view partially in schematic of the heat source employed in calibrating the thermistor type thermometers in accordance with the invention.

Referring to FIGURE 1, there is shown a thermistor thermometer 10 comprising a housing 12 which carries a bridge circuit shown in detail in FIGURE 2, a rotatable cylindrical scale 14 which is adapted to be imprinted with the numerically different temperature values over a given range of temperatures, and a null meter M. Extending from housing 12 and operatively connected to the scale 14 and the slide member 16S of potentiometer 16 (FIGURE 2) is a rotatable knob 18. Also extending from housing 12 and connected to the bridge circuit as will hereinafter become apparent, are a pair of signal leads 20 which are connected to the thermistor T. Thermistor T is a temperature sensitive resistor whose resistance varies with temperature. Finally, there extends from housing 12 a pair of jack leads generally indicated at 22 which are used only during calibration of thermometer 10.

Referring now to FIGURE 2, the bridge circuit is shown comprising fixed or constant valued resistors 24 and 26 which provide two arms of the bridge. The third arm is provided by the thermistor T, while the fourth arm comprises the potentiometer 16 in series with a fixed resistor 28. The null meter M is connected across one diagonal of the bridge and a source of potential 30 is connected across the other diagonal of the bridge. Null meter M is a galvanometer which registers zero when no current flows through it. In parallel with the null meter M are the output jack leads 22A, 22B.

During the use of the thermometer 10, the thermistor T is inserted in the appropriate ambient region. By virtue of the temperature of the ambient region the thermistor T reflects a given resistance. Generally, this resistance will upset the balance of the bridge. Accordingly, to restore the balance, the knob 18 is rotated causing the slider 16S of the potentiometer 16 to move and consequently adding or subtracting resistance from the potentiometer arm of the bridge. When the balance is restored the null meter M will be zeroed. When the null is obtained, it is merely necessary to view the scale 14 and obtain a direct reading opposite the index pointer 32. By virtue of the hereinafter described calibration method, the reading then opposite pointer 32 will indicate the temperature of the ambient region.

The calibration of a typical thermistor thermometer 10 will now be described with particular reference to FIGURE 3. Thermometer 10 is placed in a cradle 34 of a print means 36. The thermistor T of the thermometer 10 is placed in a heated chamber 38. Immediately adjacent thermistor T in chamber 38 is an accurately calibrated, standard thermocouple 40. As is hereinafter more fully described, the temperature of heat chamber 38 is continuously varied in any single cycle over a given range of temperatures through the operation of the infrared source 42 moved by the focusing drive 44. Heated chamber 38 is cooled through the agency of a heat exchanger 46. In accordance with the temperature of the heated chamber 38, standard thermocouple 40 transmits a voltage via line 48 to a conventional D.C. amplifier 50. Amplifier 50 transmits an amplified voltage to the digital readout 52 which may be a conventional digital voltmeter whose scale is calibrated in degrees Fahrenheit. Digital readout 52 is provided to allow an operator to monitor the temperatures being recorded in the heated chamber 38. In addition, the D.C. voltage is fed to the digital print wheel means 54. Print wheel means 54 in response to such voltage, positions the digital type fonts representing the temperature over the blank scale of thermometer 10.

At the same time, the thermistor T has resistance values related to the specific temperatures in the chamber 38. This resistance at any given time affects the balance in the bridge of the thermometer 10. If the bridge is out of balance the voltage is fed therefrom via the jack leads 22A, 22B to a servo amplifier 56. The servo amplifier 56 feeds a voltage to a zero driving means 58 which is mechanically coupled via means 60 to the rotatable knob 18 of the thermometer 10. The magnitude and polarity of this voltage rotates the knob 18 in the appropriate direction, so that the null or balance condition is sought by the thermometer 10. When the null is reached, no voltage is fed from jack leads 22A, 22B and consequently servo amplifier 56 no longer transmits a voltage to zero driving means 58, nor does it transmit a voltage to the print actuator 62. Print actuator 62, responds to the absence of a signal, by moving cradle 34 via a mechanical coupling 64, towards the print wheel means 54 to cause a numerical temperature indication to be printed on the scale 14 of thermometer 10 carried on said cradle 34.

Assume for instance, that the temperature in the heated chamber 38 is at 100° F. Accordingly, both the reference thermocouple 40 and the thermistor T will be at this temperature. Furthermore, assume that the rotatable knob 18 is at such an angular position that the potentiometer 16 (FIGURE 2) is set arbitrarily at the equivalent of 70° F. This arbitrary setting obviously means that the meter M in the bridge circuit is not reading zero but is reading either to the left or right thereof, indicating an imbalance in the bridge. The left reading indicates a negative voltage and the right reading indicates a positive voltage. This voltage, either negative or positive, is fed to servo amplifier 56 to energize a differential relay in print actuator 62.

Once such relay is energized, it prevents print actuator 62 from moving the cradle 34 toward print means 54 and no temperature marking can be printed on the scale 14. This positive or negative voltage which is amplified by the servo amplifier 56 feeds the zeroing drive means 58 which is locked to the knob 18 (now arbitrarily set at 70° F.). If the voltage amplified by the amplifier 56 is positive, the drive means begins to rotate clockwise; if negative, counterclockwise; turning as it does, the knob 18 which is connected to the slider 16S of potentiometer 16.

It is, therefore, obvious from the above, that the system functions as a servo system which will adjust the potentiometer 16 so that it will begin to approach the position where the bridge is in balance and no voltage appears across the meter M of the bridge. Therefore, the thermometer's bridge circuit, the D.C. amplifier 50, the servo amplifier 56 and the zeroing drive means 58 connected to the knob 18 form a simple closed loop feedback mechanism. This mechanism operates until the variable arm of the bridge is adjusted in such a manner that the bridge is in balance and no voltage appears across the meter M. At that point, print actuator 62 receives no voltage, and the absence of a voltage will be detected therein and will be effective to energize a solenoid that moves the cradle 34 toward the print wheel means 54. The temperature marking thus printed, will be the temperature of the thermocouple 40 which was translated to a voltage and amplified by D.C. amplifier 50, which in turn feeds digital print wheel means 54 to present the proper temperature digits opposite the scale 14. After the printing, the normal rise in temperature in the heat chamber 38 is available for the next cycle of operation of the system in the same manner to print the next corresponding temperature reading.

Referring to FIGURE 4 the details of the temperature generating means are shown; the same comprising a conventional infra-red source 68 and an optical system 70 is fixed on a carriage 72 movable over a base B. Optical system 70 focuses the infra-red radiation towards the heated chamber 38. Focusing drive means 44 includes a motor 74 provided with reduction gearing to drive a pinion 76 meshing with a rack member 78. The rack member 78 is mechanically connected to the carriage 72. Accordingly, as motor 74 rotates, rack 78 moves the infra-red source 42 toward and away from the heated chamber 38. Heated chamber 38 is made from a copper block through which numerous coolant carrying channels are drilled. The channels are communicating and connected via conduits 80 and 82 to a conventional heat exchanger 46. Such a cooling system is adapted to remove heat from the chamber 38 as it is scanned from the highest temperature setting, say 108° F., to the lowest temperature setting, say 94° F. It should be noted that the highest temperature is produced when the infra-red source 42 is directly focused on the heated chamber 38 and the lower heats are generated as the source is retracted therefrom.

More particularly the heated chamber 38 simulates a black body which encloses the thermocouple 40 and the thermistor T, which is to be calibrated. The infra-red source 68 and its focusing means 70 are mounted a few feet from the heated chamber 38. The infra-red source 68 is focused by the optical system 70 in such a manner that infra-red rays are centered on one end of the heated chamber 38. The infra-red source 68 and its focusing system 70 are mounted on carriage 72 which is moved by rack member 78 in such a manner that the optical system 70 can be moved back and forth for focusing and refocusing the system.

Thus the amount of heat which is directed into the heated chamber 38 is a direct function of the degree of focusing which is established by the movement of carriage 72. It is of course the purpose of the source 68 and the optical system 70 to scan the heated chamber 38 through a determined temperature range of from approximately 94° F. to 108° F., by varying the infra-red energy focused in respect to heated chamber 38. In order to achieve such a scan range, it is necessary to remove heat from the heated chamber 38 by way of the heat exchanger 46 which constantly removes heat from the opposite end of heated chamber 38. For example, with no infra-red radiation being directed into heated chamber 38, and the cooling system including heat exchanger 46 working, heated chamber 38 will, after a short time, come to the temperature of the coolant. This temperature will of course be sensed by the thermocouple 40 which is located in the center of heated chamber 38. The infra-red source 68 is then energized and the optical system 70 is defocused in such a manner that heated chamber 38 reaches a temperature of 94° F. with the cooling system operating. In other words, the defocusing takes place by means of the rack member 78 retracting the movable carriage 72 away from heated chamber 38.

The time necessary for heated chamber 38 to reach the temperature of 94° F. from the temperature at which it was solely due to the effect of cooling system alone on chamber 38, is only dependent on the Δ temperature function of the chamber. In other words, it is the time it takes for the heat to travel through heated chamber 38. With a very small chamber of this kind, such a time function is in the order of less than ten seconds. The temperature rise is of course sensed by the thermocouple 40. The infrared optical system including the source 68 and the optical system 70 is swept into full forcus, that is, it is gradually moved toward heated chamber 38 so that the focal point of the system is effectively against heated chamber 38. While this sweeping action takes place the temperature in heated chamber 38 rises and as the focal point approaches the opposed end of heated chamber 38, the temperature in the chamber rises until the upper limit of the desired temperature range is reached; which is approximately 108° F. The entire scanning operation can be accomplished in considerably less than one minute.

Figure 5:
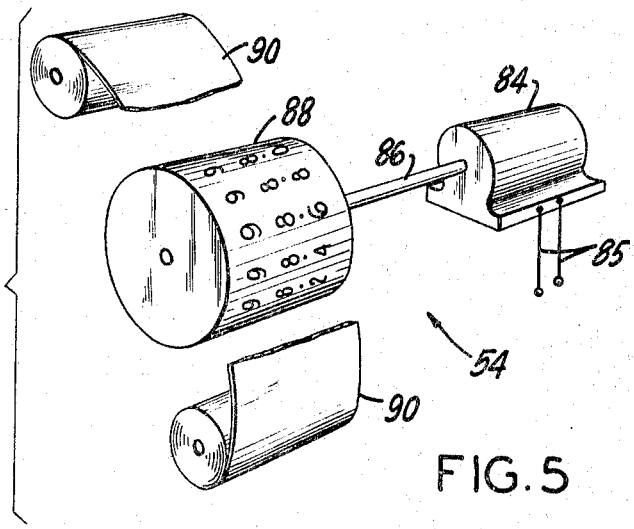
FIGURE 5 shows the digital print wheel means of FIGURE 3.
Figure 6:
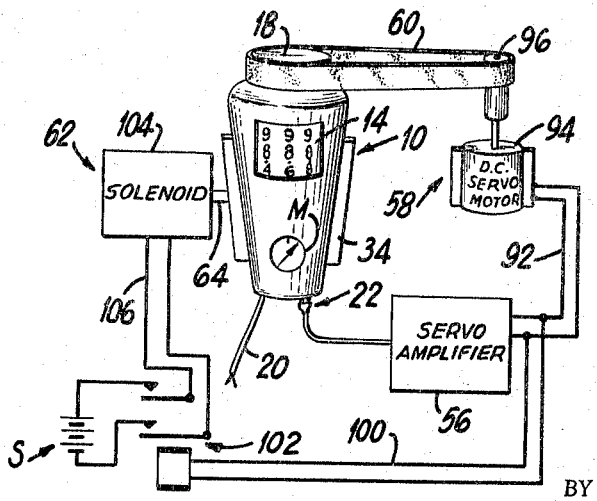
FIGURE 6 shows generally the remainder of the printing mechanism for printing the calibrated scales of the thermistor type thermometer.

The print means 36 is shown in detail in FIGURE 5 where the digital print wheel means 54 comprising a D.C. servo motor 84 whose shaft is connected to a printing cylinder 88 having thereon type fonts angularly arrayed representing the temperature values to be printed. Disposed over the print cylinder 88 is an inked ribbon 90 moving from a supply to a takeup roll, by known advancing mechanism, not shown. In essence, digital print wheel means 54 receives a D.C. voltage on lines 85 from D.C. amplifier 50 (FIGURE 3) and the amplitude of this voltage causes a representative angular displacement of printing cylinder 88. Located directly below printing cylinder 88 is the cradle 34 (FIGURE 6) which supports the thermometer 10.

The thermometer 10 is positioned by cradle 34, so that the blank scale 14 is directly below printing cylinder 88 and slightly displaced therefrom. The voltage from the null meter M is fed via jack leads 22A, 22B, to servo amplifier 56, which may be a conventional D.C. amplifier. The output of servo amplifier 56 is fed via leads 92 to the zeroing drive means 58 which comprises a D.C. servo motor 94. The output shaft of D.C. servo motor 94 is connected to a pulley 96 which drives a belt 60 engaging the rotatable knob 18 of the thermometer 10. Servo amplifier 56 is also connected via leads 100 to print stroke actuator 62 which comprises a conventional differential relay 102, solenoid 104 and current source S. Conventional differential relay 102 is actuated only as long as it receives a signal on leads 100 and breaks a circuit from a current source S which normally energizes the solenoid 104. When no signal is supplied to relay 102, it is de-actuated and current is fed from said source S via the then closed contacts of relay 102 and the leads 106 to solenoid 104. Plunger 64 of solenoid 104 is connected to cradle 34. When solenoid 104 is actuated, it advances cradle 34 and the thermometer 10 against the print ribbon 90 and print cylinder 88 to effect the printing of the digits representing the temperature value at that time on scale sheet 14. The cradle 34 is then immediately withdrawn to its normal retracted position by suitable means, such as a spring or the like, not shown.

While only one embodiment of the invention has been shown and described in detail there will now be obvious to those skilled in the art many modifications and variations which satisfy many or all of the objects of the invention but which do not depart from the spirit thereof as defined in the appended claims.

What is claimed is:

1. Apparatus for calibrating a thermistor thermometer which includes a movable scale adapted to have indicia recorded thereon, and a null indicating circuit for transmitting a signal except when a null is indicated, including a mechanically adjustable means connected to said scale for adjusting a parameter of said circuit to indicate a null, and a thermistor, said apparatus comprising a heat chamber, said thermistor being positionable in said heat chamber, a thermoelectric element in said heat chamber for generating a signal having a characteristic representing the temperature of said heat chamber, means for supporting said thermometer, indicia printing means operatively positioned with respect to said thermometer when the latter is supported by said supporting means, said indicia printing means including means responsive to the characteristic of the signal generated by said thermoelectric means for positioning printing indicia representing the temperature of said heat chamber opposite said movable scale and electromechanical means mechanically connected to said mechanically adjustable means and responsive to signals from said null indicating circuit for adjusting said mechanically adjustable means to minimize the signal from said null indicating circuit.

2. Apparatus for calibrating a thermistor thermometer which includes a movable scale adapted to have indicia recorded thereon, and a null indicating circuit for transmitting a signal except when a null is indicated, including a mechanically adjustable means connected to said scale for adjusting a parameter of said circuit to indicate a null, and a thermistor, said apparatus comprising a heat chamber, said thermistor being positionable in said heat chamber, a thermoelectric element in said heat chamber for generating a signal having a characteristic representing the temperature of said heat chamber, means for supporting said thermometer, indicia printing means operatively positioned with respect to said thermometer when the latter is supported by said supporting means, said indicia printing means including means responsive to the characteristic of the signal generated by said thermoelectric means for positioning printing indicia representing the temperature of said heat chamber opposite said movable scale, electromechanical means mechanically connected to said mechanically adjustable means and responsive to signals from said null indicating circuit for adjusting said mechanically adjustable means to minimize the signal from said null indicating circuit and means responsive to substantially the absence of the signal transmitted from said null indicating circuit for moving said thermometer supporting means and said indicia printing means together so that the indicia then operatively opposite said movable scale are recorded on the latter.

3. The apparatus of claim 2 further comprising means for variably heating said heat chamber over a given range of temperature.

4. The apparatus of claim 3 wherein said heat chamber includes a plurality of passageways adapted to carry a circuit coolant, a heat exchanger and means for connecting said passageways to said heat exchanger.

5. The apparatus of claim 3 wherein said variable heating means includes an infra-red radiation source and an optical system for focusing the infra-red radiation toward said heat chamber, and means for varying the infra-red radiation focused on said heat chamber to provide said range of temperatures.

6. The apparatus of claim 3 wherein said variable heating means includes an infra-red radiation source, an optical system for focusing the infra-red radiation to a focal point and means for moving said infra-red radiation source and said optical system so that said focal point moves towards and away from said heat chamber.

References Cited by the Examiner
UNITED STATES PATENTS

| | | | |
|---|---|---|---|
| 1,593,626 | 7/1926 | Foote | 73—362 |
| 2,931,735 | 4/1960 | Richards | 73—1 |
| 3,139,753 | 7/1964 | Brudner | 73—362 |

LOUIS R. PRINCE, *Primary Examiner.*

S. C. SWISHER, *Assistant Examiner.*